United States Patent [15] 3,661,501
Corbett et al. [45] May 9, 1972

[54] CATALYTIC TREATMENT OF SHAPED ARTICLES MADE FROM FIBER-FORMING SYNTHETIC POLYMERS

[72] Inventors: William Michael Corbett; David Harrison; Michael Mundie Robertson, all of Harrogate, England

[73] Assignee: Imperial Chemical Industries Limited, London, England

[22] Filed: Sept. 11, 1967

[21] Appl. No.: 666,927

[52] U.S. Cl....................8/115.5, 260/DIG. 21, 260/75 T, 260/78 SC, 260/857 R, 117/138.8
[51] Int. Cl.................D06m 7/00, D06m 13/34, C08g 41/04
[58] Field of Search.................8/115.5, 116.2; 117/138.8; 260/857, DIG. 21

[56] References Cited

UNITED STATES PATENTS

| | | | |
|---|---|---|---|
| 3,473,956 | 10/1969 | McIntyre | 117/138.8 |
| 3,022,131 | 2/1962 | Selle | 8/115.5 |
| 3,234,185 | 2/1966 | Rainer | 260/78 |
| 3,047,355 | 7/1962 | Brachel et al. | 8/115.5 |
| 3,428,710 | 2/1969 | Daumiller et al. | 260/857 |
| 3,445,276 | 5/1969 | Pikula | 117/138.8 |

Primary Examiner—George F. Lesmes
Assistant Examiner—B. Bettis
Attorney—Cushman, Darby & Cushman

[57] ABSTRACT

Procedure for imparting durable antistatic properties to shaped articles made from fiber-forming polyesters or polyamides by modifying the surface thereof. The article is heated while in intimate contact with a polyethylene oxide derivative such as polyethylene glycol diamine and in the presence of an inorganic catalyst such as potassium iodide to effect surface modification thereof.

4 Claims, No Drawings

CATALYTIC TREATMENT OF SHAPED ARTICLES MADE FROM FIBER-FORMING SYNTHETIC POLYMERS

This invention relates to the treatment of shaped articles made from fiber-forming synthetic polymers.

Surface treatments of shaped articles made from essentially linear crystallizable polyesters and polyamides are known. One effective method of modifying such shaped articles in the form of fibers, filaments, films and fabrics, so that they have an antistatic and hydrophilic surface, is to treat the surface of the article with a poly(ethylene oxide) or a derivative of a poly(ethylene oxide), optionally in conjunction with a compound which reacts with the poly(ethylene oxide) or its derivative to form a polymeric film. While these treatments in general are effective directly after application of the reactants, they are not particularly durable to prolonged washing, scouring or to exposure to ultra-violet light.

According to the present invention a shaped article, in the form of a filament, fiber, fabric or film, made from a synthetic fiber-forming polyester or polyamide, is provided with a durable, modified surface by subjection to thermal treatment at a temperature below the melting temperature of the material of the shaped article while said shaped article is in intimate contact with a reactive polymeric compound which has a molecular weight of at least 600, contains at least one reactive group as defined hereinafter, and contains at least one surface-modifying polymeric group, characterized in that the treatment is carried out in the presence of an inorganic catalyst whereby said reactive polymeric compound is attached chemically to the surface of the shaped article substantially without cross-linking. The inorganic catalyst is preferably present in an amount equal to at least 1 percent of the weight of the reactive polymeric compound.

The surface modification provided on shaped articles made from polyesters or polyamides in accordance with the present invention is durable, that is to say, it is resistant to repeated washing, even to scouring, and also to degradation by ultra-violet light.

Examples of inorganic catalysts which may be used in the invention include iodine, compounds of iron in ferrous or ferric state, selenium dioxide, potassium thiocyanate, sodium dihydrogen phosphate, chromium-containing compounds, hydriodic acid, iodic acid, periodic acid, phosphomolybdic acid and salts of these acids.

The iron in its non-metallic state may be present in the form of its slats or their solutions or in the form of their co-ordinating complexes in either ferrous or ferric state. The reactive group of the reactive polymeric compound is an amine group, carboxylic acid group or a salt or ester thereof or an isocyanate group.

The surface-modifying polymeric group comprises at least one of the following: water-solvatable polyoxyalkylene group, liquid-repellent group containing siloxane or fluorocarbon segments, or a group containing a plurality of alcoholic hydroxyl radicals.

The shaped articles are made from synthetic fiber-forming polyesters such as poly(ethylene terephthalate), poly(1,4-bis-methylene cyclohexane terephthalate), poly(ethylene oxybenzoate) and their copolymers or from synthetic fiber-forming polyamides such as nylon 6 and nylon 66. The treatment with amines is particularly suitable for polyamides.

The treatment may be carried out in the presence of antioxidants, and in the case of the treatment with a reactive polymeric compound containing a poly(oxyalkylene) group particularly in the presence of bisphenols connected by sulphur or methylene bridges and peroxide decomposers.

The treatment e.g. with amines may be carried out in the presence of a dye or an optical brightener.

Our invention is now described in greater detail by reference to the following examples in which all parts and percentages are by weight, unless stated otherwise and which illustrate but do not limit our invention.

EXAMPLES 1–7

Preparation of Compounds

To an aqueous solution of polyethylene glycol diamine (prepared by reaction of polyethylene glycol M.Wt. 1540 with thionyl chloride followed by aqueous ammonia) was added bis(2-hydroxy-3-$\alpha$-methylcyclohexyl-5-methyl-phenyl)-methane (0.5 percent by weight on the weight of polyethylene glycol diamine) as a 30 percent by weight solution in an ethylene oxide condensate of nonylphenol, followed by an aqueous solution of the various catalysts (3 percent by weight of solid on the weight of polyglycol diamine) listed in Table 1 below.

Application of Compounds to Fabrics and Textiles

The concentration of the polyethylene glycol diamine solution was such that when the solution was padded onto poly(ethylene terephthalate) fabric of taffeta construction, 3 percent by weight of the polyethylene glycol diamine was picked up by the fabric. The fabric was then air-dried and heated at 200° C. for 5 minutes in an air oven. It was washed up to 50 times in a domestic washing machine with a 0.07 percent aqueous solution of detergent at 60° C. Samples of the fabric after washing were rinsed for 10 minutes in an aqueous solution of potassium bromide (1.4 g.p.l.), spin rinsed for 2 minutes, and finally tumble dried at 60° C. The lengthways electrical resistance of 7 × 1½ inches strips was measured after they had been conditioned at 65 percent relative humidity.

The results shown in the following table were obtained.

TABLE 1

| Example No. | Catalyst | Electrical resistance $\log_{10}$ ohms | | | |
|---|---|---|---|---|---|
| | | 1 wash | 10 washes | 30 washes | 50 washes |
| 1 | $K_4Fe(CN)_6$ | 9.23 | 9.36 | 10.23 | 11.06 |
| 2 | $K_3Fe(CN)_6$ | 9.11 | 9.08 | 9.23 | 9.95 |
| 3 | $FeSO_4$, $(NH_4)_2SO_4$ | 9.53 | 9.46 | 10.48 | 11.46 |
| 4 | $Na_4Fe(CN)_5NH_2$ | 9.28 | 9.34 | 10.11 | 11.23 |
| 5 | $Na_2Fe(NO)(CN)_5$ | 9.48 | 9.54 | 11.49 | 11.74 |
| 6 | $(NH_4)_2SO_4, Fe_2(SO_4)_3$ | 9.56 | 9.48 | 10.23 | 11.32 |
| 7 | $FeSO_4$ | 9.61 | 9.71 | 10.75 | 11.86 |
| Comparative Example A | None | 12.60 | 12.90 | >13.3 | >13.3 |

EXAMPLE 8

To a 5 percent by weight aqueous solution of the amine prepared from a poly(ethylene oxide) condensate of average molecular weight 1,540 were added various amounts of potassium iodide (see Table 2) and the solution was then padded onto poly(ethylene terephthalate) fabric having a taffeta construction. The dried fabric, which retained 3 percent by weight of the amine derivative, was heated at 200° C. for 5 minutes in an oven and then washed once. The weight of the amine derivative remaining on the fabric and the electrical resistance of the fabric were measured before the fabric was washed a further 50 times. From Table 2 it will be seen that potassium iodide at a concentration of at least 1.0 percent by weight on the weight of the amine derivative has a pronounced effect upon the effectiveness of the treatment.

All of the samples of catalytically treated fabric were hydrophilic shown by the rapid repulsion of oil stains when immersed in water. This effect was still very good even after 50 washes.

TABLE 2

| | Percent KI by weight on the weight of poly-(ethylene oxide) diamine | Poly(ethylene-oxide) diamine remaining on fabric after one wash (percent by weight) | Resistance of fabric, $\log_{10}$ ohms | | | | |
|---|---|---|---|---|---|---|---|
| | | | 1 wash | 10 washes | 20 washes | 30 washes | 50 washes |
| (a)* | 0.00 | 0.0 | 10.00 | 10.71 | | 12.04 | 13.00 |
| (b) | 0.01 | 0.0 | 9.61 | 10.20 | | 11.02 | 12.40 |
| (c) | 0.50 | 0.17 | 9.51 | 10.75 | 11.18 | 12.08 | 12.04 |
| (d) | 1.00 | 0.49 | 9.18 | 9.72 | 9.91 | 10.70 | 10.89 |
| (e) | 1.10 | 0.59 | 9.04 | 8.95 | | 9.23 | 10.30 |
| (f) | 2.00 | 1.02 | 8.92 | 9.10 | 9.04 | 9.36 | 9.38 |
| (g) | 3.00 | 1.43 | 8.86 | 9.06 | 8.98 | 9.20 | 9.20 |
| (h) | 5.00 | 0.71 | 9.04 | 9.42 | 9.48 | 9.74 | 9.85 |
| (i) | 10.00 | 1.05 | 8.95 | 9.42 | 9.40 | 9.48 | 9.48 |

*Comparative example.

EXAMPLE 9

Poly(ethylene terephthalate) fabric was treated as in Example 8 except that the potassium iodide was replaced by the catalysts given in Table 3. It will be seen from the table that iodine, hydriodic acid, and salts of hydriodic acid are effective catalysts.

TABLE 3

| Catalyst | Percent catalyst by weight on weight of poly(ethylene oxide) diamine | Poly(ethylene oxide) diamine remaining on fabric after one wash (percent by weight) | Resistance of fabric, $\log_{10}$ ohms | | | |
|---|---|---|---|---|---|---|
| | | | 1 wash | 10 washes | 30 washes | 50 washes |
| None* | | 0.00 | 10.00 | 10.71 | 12.04 | 13.00 |
| Iodine | 2.25 | 0.71 | 9.15 | 8.98 | 9.85 | 10.26 |
| Sodium iodide | 2.85 | 1.58 | 9.11 | 9.23 | 9.25 | 9.57 |
| Lithium iodide | 2.70 | 1.35 | 9.20 | 8.99 | 9.26 | 9.51 |
| Cuprous iodide | 1.95 | 0.67 | 9.20 | 9.15 | 9.53 | 9.91 |
| Hydriodic acid | 2.70 | 0.86 | 9.08 | 9.18 | 9.59 | 10.04 |

*Comparative example.

EXAMPLE 10

Poly(ethylene oxide) diamines of various molecular weights were prepared and to the aqueous solutions was added potassium iodide as given in Table 4. The solutions were applied to poly(ethylene terephthalate) fabric as in Example 8, and the electrical resistance of the fabric measured periodically during 50 machine washes. The resistances given in Table 4 indicate that poly(ethylene) diamines prepared from poly(ethylene oxide) condensates of molecular weight of 600 and above provide an effective treatment.

EXAMPLE 11

Poly(ethylene terephthalate) fabric was treated as in Example 8 with the poly(ethylene oxide) derivatives listed in Table 5. From the table it will be seen that the derivatives applied without catalyst do not provide an effectively durable antistatic treatment whereas in the presence of potassium iodide they provide a durable treatment.

EXAMPLE 12

Warp knit fabrics of nylon 6.6 containing stabilizers against thermal degradation were padded with aqueous solutions of poly(ethylene oxide) diamine of molecular weight 1540 containing 3 percent by weight on the weight of diamine of the inorganic compounds given in Table 6. The dried fabrics which retained 3 percent by weight of the poly(ethylene oxide) diamine, were heated at 200° or 215° for 5 minutes in an oven, and then washed once. The weight of the amine compound remaining on the fabrics and the electrical resistance of the

TABLE 4

| Mol. wt. of poly(ethylene oxide) used to prepare diamine | Percent potassium iodide on poly(ethylene oxide) diamine (wt./wt.) | Poly(ethylene oxide) diamine remaining on fabric after one wash (percent by wt.) | Resistance of fabric, $\log_{10}$ ohms | | | |
|---|---|---|---|---|---|---|
| | | | 1 wash | 10 washes | 30 washes | 50 washes |
| 300* | 3.0 | 0.00 | 11.50 | 12.90 | ∞ | ∞ |
| 600 | 3.0 | 1.19 | 9.40 | 9.53 | 9.90 | 10.79 |
| 1,540 | 3.0 | 1.43 | 8.86 | 9.06 | 9.20 | 9.20 |
| 4,000 | 3.0 | 1.28 | 9.48 | 9.56 | 9.48 | 9.46 |
| 20,000 | 3.0 | 0.96 | 9.43 | 9.80 | 9.42 | 9.83 |

*Comparative example.

TABLE 5

| Derivative of poly(ethylene oxide) | Catalyst | Percent catalyst on weight of poly(ethylene oxide) derivative | Resistance of fabric, $\log_{10}$ ohms | | | |
|---|---|---|---|---|---|---|
| | | | 1 wash | 10 washes | 30 washes | 50 washes |
| Carboxymethoxy derivative of poly(ethylene oxide), av. m. wt. 1540 | None* | | 13.30 | | | |
| | KI | 3.0 | 9.69 | 10.54 | 10.86 | 11.86 |
| Sodium carboxy derivative of poly(ethylene oxide), av. m. wt. 1540 | KI | 3.0 | 10.98 | 11.61 | 12.20 | 12.90 |
| Carboxymethoxy derivative of poly(ethylene oxide), av.m. wt. 20,000 | None* | | 12.60 | 13.00 | | |
| | KI | 3.0 | 9.70 | 9.48 | 10.05 | 11.59 |
| Carboxymethoxy derivative of poly(ethylene oxide), av. m. wt. 6,000 | None* | | | | 11.85 | 12.48 |
| | KI | 3.0 | 10.15 | 10.40 | 10.49 | 10.40 |

* Comparative examples.

fabrics were measured. The fabrics were then scoured at 100° C. for 1 hour in an aqueous solution of sodium carbonate (2 g.p.l.) and sodium oleyl sulphate (1 g.p.l.). It can be seen from the table that ferrous sulphate, potassium iodide and phosphomolybdic acid are effective catalysts for the purposes of our invention.

TABLE 6

| Catalyst | Temperature of baking, | Poly(ethylene oxide) remaining on fabric after 1 wash (percent by weight) | Resistance of fabric ($\log_{10}$ ohms) After 1 wash | After scouring at 100° C. |
|---|---|---|---|---|
| Ferrous sulphate | 200 | 1.77 | 10.11 | 11.00 |
| Do | 215 | 1.74 | 9.97 | 10.71 |
| Potassium iodide | 200 | 0.93 | 10.34 | 11.71 |
| Do | 215 | 0.72 | 10.23 | 11.85 |
| Phosphomolybdic acid | 200 | 2.16 | 10.18 | 11.59 |
| Do | 215 | 1.74 | 9.97 | 10.28 |
| None* | 215 | 0 | 10.43 | 13.0 |

*Comparative example.

EXAMPLE 13

Example 12 was repeated using potassium iodide as catalyst warp knit fabric prepared from nylon 6 and a baking temperature of 200° C. for 5 minutes. The resistance ($\log_{10}$ ohms) of the fabric after 1 was was 10.00; after 10 washes 9.38; 30 washes 10.78; and 50 washes 10.42.

EXAMPLE 14

Fabric was treated as in Example shown in Table 2(d) and after 1 machine wash had a resistance of ($\log_{10}$ ohms) 8.72. It was scoured at 100° C. with an aqueous solution of sodium carbonate (2 g.p.l.) and sodium oleyl sulphate (1 grams per liter). Table 7, which gives resistance of the fabric at various times, shows that the finish is stable to prolonged scouring.

TABLE 7

| Time of Scouring at 100° C. (hrs.) | 1 | 2 | 3 | 4 | 7 | 8 | 10½ | 11½ |
|---|---|---|---|---|---|---|---|---|
| Resistance ($\log_{10}$ ohms) | 9.08 | 9.00 | 9.11 | 9.11 | 9.40 | 9.15 | 9.92 | 9.65 |

EXAMPLE 15

A blocked isocyanate derivative of poly(ethylene oxide) of average molecular weight of 20,000 was prepared by reacting the poly(ethylene oxide) in benzene solution with two equivalents of methylene bis(phenyl-4-isocyanate) followed by o-phenylphenol.

An aqueous solution (5 percent by weight) of the derived product was stabilized by the addition of 0.5 percent by weight on the weight of product of bis(2-hydroxy-3-αmethyl-cyclohexyl-5-methylphenyl) methane, and then padded at the 3 percent by weight level on poly(ethylene terephthalate) fabric.

The two samples of fabric were baked for 5 minutes at 200° C. in an air oven and then given one machine wash. After the electrical resistance had been measured, the fabrics were washed a further 49 times. It will be seen from Table 8 that the addition of potassium iodide makes a profound difference to the effectiveness of the treatment.

In the foregoing examples the poly(ethylene oxide) derivatives used were stabilized to heat by the addition of 0.5 percent by weight of bis(2-hydroxy-3-αmethylcyclohexyl-5-methyl phenyl) methane.

Table 8

| | Electrical Resistance-$\log_{10}$ohms | | | |
|---|---|---|---|---|
| | 1 Wash | 10 Washes | 30 Washes | 50 Washes |
| Without Potassium* Iodide | 10.06 | 12.23 | ∞ | ∞ |
| With Potassium Iodide | 9.58 | 9.72 | 10.16 | 11.92 |

*Comparative example.

EXAMPLE 16

Poly(ethylene terephthalate) fabrics were padded with aqueous solutions of poly(ethylene oxide) diamine of molecular weight 1,540 containing 3 percent by weight of diamine of the inorganic compounds given in Table 9. The dried fabrics, which retained 3 percent by weight of the diamine, were heated at 200° C. for 5 minutes in an oven, and then washed once. The weights of the amine compound remaining on the fabrics were measured. The fabrics were then scoured and tested as in Example 12.

TABLE 9

| Catalyst | Poly(ethylene oxide) remaining on fabric after 1 wash (% by weight) | Resistance of fabric ($\log_{10}$ ohms) after scouring at 100° C. for 1 hour |
|---|---|---|
| Sodium dihydrogen phosphate | 0.33 | 9.61 |
| Potassium thiocyanate | 0.39 | 10.68 |
| Selenium dioxide | 0.93 | 10.23 |
| Phosphomolybdic acid | 1.44 | 9.38 |
| Potassium dichromate | 1.74 | 11.82 |
| None * | 0 | 12.21 |

*Comparative Example

These results show that the above inorganic compounds are effective catalysts for the surface treatment of polyethylene terephthalate articles in accordance with the present invention.

EXAMPLE 17

This example illustrates a durable surface modification of poly(ethylene terephthalate) by a diamino-polydimethylsiloxane using either selenium dioxide or phosphomolybdic acid as catalyst.

α, ω-Diaminodiphenylpolydimethylsiloxane containing 20 dimethylsiloxane units per molecule, i.e., of molecular weight 1,600 – 1,700, and selenium dioxide (3 percent by weight on the weight of the polysiloxane) were dissolved in ethanol. The resulting solution was applied to a poly(ethylene terephthalate) fabric by padding to give 2 percent by weight of polysiloxane on fabric and the coated fabric was then baked at 200° C. for 5 minutes in an oven. A further poly(ethylene terephthalate) fabric was similarly treated using phosphomolybdic acid instead of selenium dioxide. Samples of the treated fabrics were washed 10 and 50 times and were then subjected to the Bundesmann absorption test. The results obtained are shown in Table 10 which also gives comparative results obtained on untreated fabric and on fabric treated with the polysiloxane but without an inorganic catalyst.

TABLE 10

| Catalyst | 10 wash samples | | 50 wash samples | |
|---|---|---|---|---|
| | % Absorption | Penetration (mls.) | % Absorption | Penetration (mls.) |
| *Untreated fabric | 45 | 98 | | |
| *None | 12 | 12 | 19 | 12 |
| Selenium dioxide | 8 | 2 | 8 | 1 |
| Phosphomolybdic acid | 9 | 3 | 7 | 1 |

*Comparative Examples

It can be seen from the above results that the process of the present invention confers a durable water repellent surface on a polyester shaped article.

Referring to Tables 4 to 10, it will be seen that reactive polymeric compounds having molecular weights of 1,500 – 1,700 are particularly suitable for the present invention.

What is claimed is

1. A process for imparting durable anitstatic properties to a shaped article comprising the step of heating said article to a temperature below the melting temperature thereof while said article is in intimate contact with poly(ethylene oxide) diamine which has a molecular weight of at least 600, wherein:
   a. said shaped article is selected from the group consisting of filament, fiber, fabric, and film;
   b. said shaped article is made from a synthetic fiber-forming polyester; and
   c. said heating is carried out in the presence of at least 1 percent (by weight of said diamine) of an inorganic catalyst; whereby said poly(ethylene oxide) diamine is attached chemically to the surface of the shaped article substantially without cross linking.

2. The process of claim 1, wherein said diamine has a molecular weight of from about 1,500 to about 1,700.

3. The process of claim 2, wherein:
   a. the fiber-forming polyester is selected from the group consisting of poly(ethylene terephthalate), poly(1,4-bis-methylene cyclohexane terephthalate), and poly(ethylene oxybenzoate); and
   b. said inorganic catalysts is selected from the group consisting of iodine, compounds of iron (in ferrous or ferric state), selenium dioxide, potassium iodide, potassium thiocyanate, sodium dihydrogen phosphate, chromium-containing compounds, hydriodic acid, iodic acid, periodic acid, phosphomolybdic acid, and the salts of these acids.

4. The process of claim 3, wherein said inorganic catalyst is potassium iodide.

* * * * *